United States Patent [19]
Palubniak et al.

[11] 3,754,649
[45] Aug. 28, 1973

[54] ARTIFICIAL KIDNEY MACHINE

[75] Inventors: Paul Palubniak; Sung C. Lee, both of Bridgeport, Conn.

[73] Assignee: LPT Corp., Bridgeport, Conn.

[22] Filed: Nov. 17, 1971

[21] Appl. No.: 199,437

[52] U.S. Cl.................. 210/103, 210/143, 210/321
[51] Int. Cl............................................. B01d 31/00
[58] Field of Search....................... 210/22, 96, 103, 210/143, 321

[56] References Cited
UNITED STATES PATENTS
| | | | |
|---|---|---|---|
| 3,441,136 | 4/1969 | Serfass et al. | 210/103 X |
| 3,506,126 | 4/1970 | Serfass et al. | 210/96 |
| 3,352,799 | 11/1967 | Austin et al. | 210/103 X |

Primary Examiner—Frank A. Spear, Jr.
Attorney—Robert A. Buckles and Garold E. Bramblett, Jr.

[57] ABSTRACT

A batch-type artificial kidney machine especially adapted for home use and operation by non-professionals. The machine is automatic in operation with all functions controlled by a single four-position switch.

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

8 Claims, 6 Drawing Figures

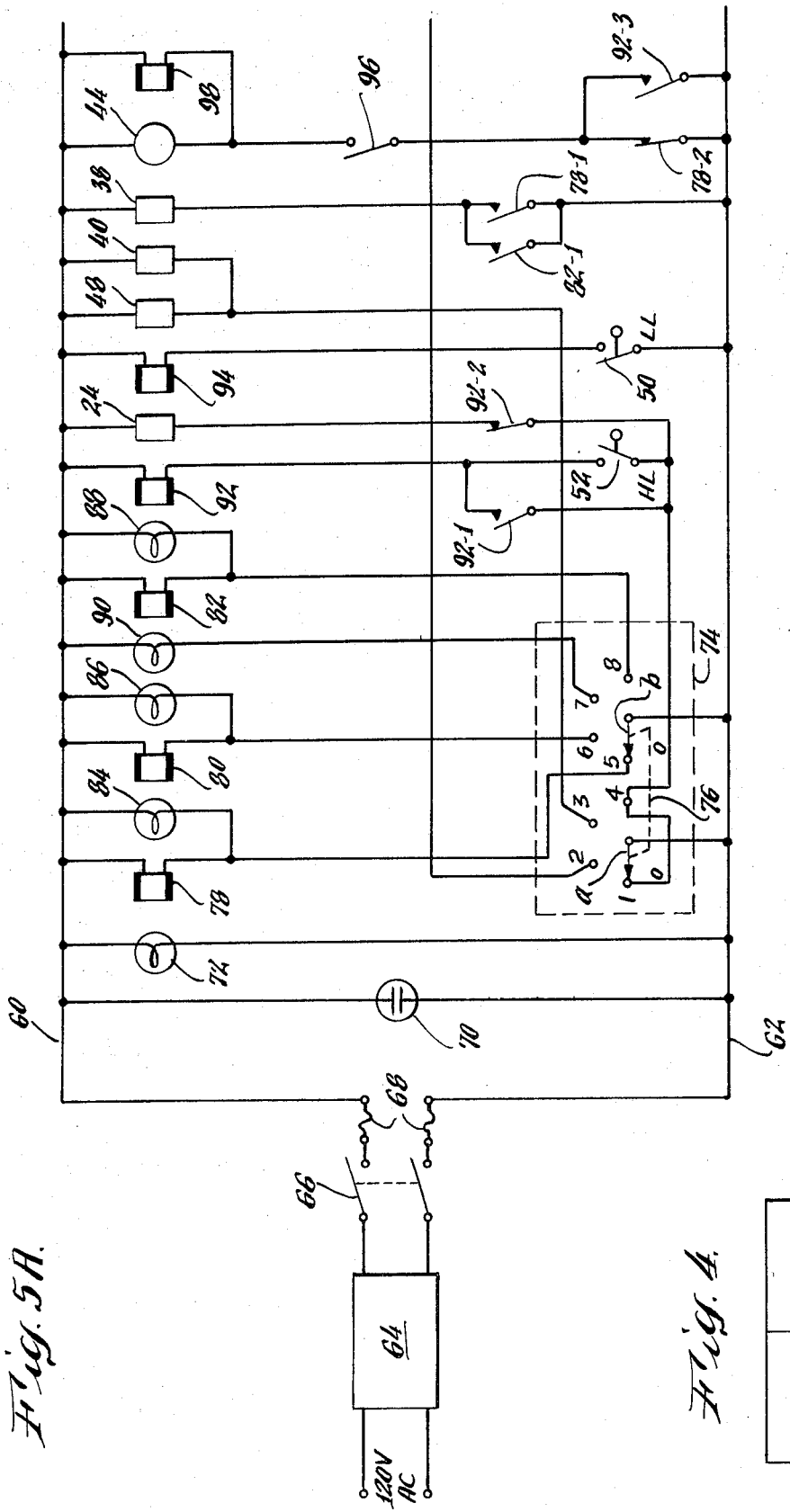

3,754,649

ARTIFICIAL KIDNEY MACHINE

BACKGROUND OF THE INVENTION

This invention relates to artificial kidney, or hemodialysis, machines. Many persons with renal failure or serious disfunction have been enabled to live essentially normal lives by being connected at regular intervals to artificial kidney machines. The blood of these patients is passed through a coil or along a membrane which is also in contact with a dialysate solution. The blood impurities which, in a healthy person, are removed by the kidney, pass through the membrane or coil into the dialysate which is then discarded. Although these machines have saved many lives, their application has been limited by two important factors. One factor is the high cost of such machines which often limits the number that any given institution can afford. This also limits the number of patients that can be treated. The other, and closely allied, factor is the fact that these machines are usually quite complicated and require medically trained personnel for their operation.

Accordingly, it is a primary object of this invention to provide an inexpensive artificial kidney machine.

Other objects are to provide such a machine which is compact, portable, and suitable for home use; and to provide such a machine which can be operated by personnel without medical training. The manner in which these objects are achieved will be apparent from the following description and appended claims.

SUMMARY OF THE INVENTION

An artificial kidney apparatus which includes a dialyzer unit having means for passing a patient's blood therethrough. There is also provided a dialysis fluid tank to which water inlet means are connected. The dialysis fluid is passed from the tank through the dialyzer unit to waste. A heater is included in the apparatus, together with means for recirculating a portion of the dialyzer fluid in the dialyzer unit through the heater. The patient's condition is automatically monitored during dialysis. The apparatus includes means for controlling the patient's blood flow, the water inlet, the dialysis fluid flow, and the recirculator, all in accordance with one of a plurality of preselected program cycles. Selection and implementation of any one of the cycles in controlled by a single multi-position switch. The patient's blood flow is stopped by the monitoring means in response to a preselected physical condition and means are included for indicating the existence of such a condition.

BRIEF DESCRIPTION OF THE DRAWINGS

With particular reference to the drawings,

FIG. 4 illustrates the relationship between the drawings of FIGS. 5A and 5B; and FIGS. 5A and 5B are a schematic wiring diagram of the machine of this invention.

DESCRIPTION OF THE PREFERRED EMBODIMENT

Artificial kidney machines may be broadly classified into two different types: the batch-type and the proportioning-type. In the batch-type, the dialysate is premixed as a solution of dialysate concentrate in water. In the proportioning system, the dialysate solution is continuously formed by injecting a measured flow of concentrate into a stream of water. The artificial kidney machine of this invention is of the batch-type, as such a system is particularly adaptable to an inexpensive and simplified construction.

Figure 1:
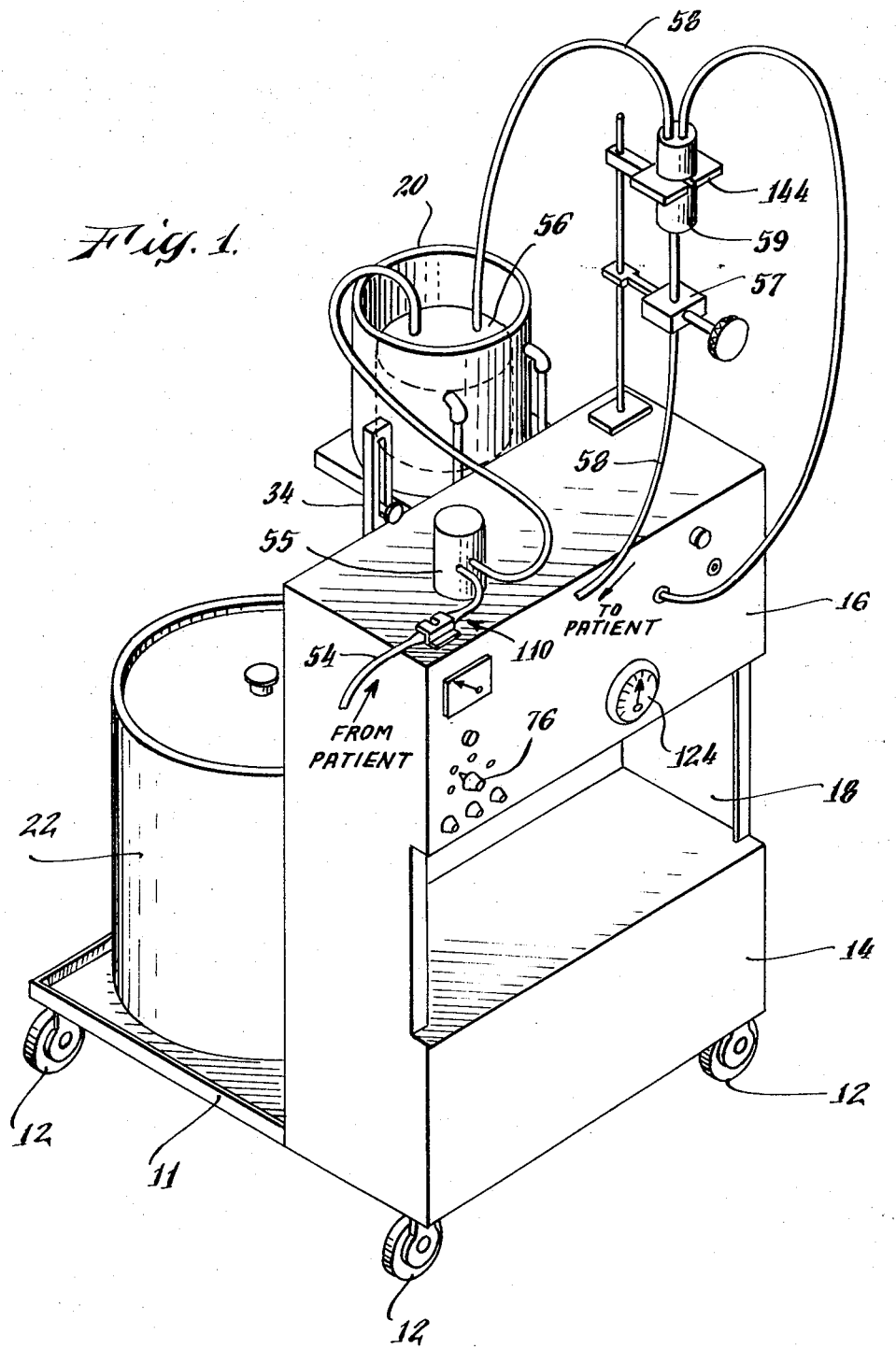
FIG. 1 is a perspective view of an artificial kidney machine in accordance with the present invention.

The overall appearance of the artificial kidney machine of this invention is shown in FIG. 1. It comprises a cabinet 10 mounted on a frame 11 and supplied with casters 12. The cabinet is divided into a lower portion 14 which houses the motors, pumps, valves etc. and an upper portion 16 housing the circuit elements, these portions being separated by a shelf area 18. A coil container 20 is mounted at the top of the cabinet and the dialysate tank 22 is mounted at the rear of the cabinet.

Figure 2:
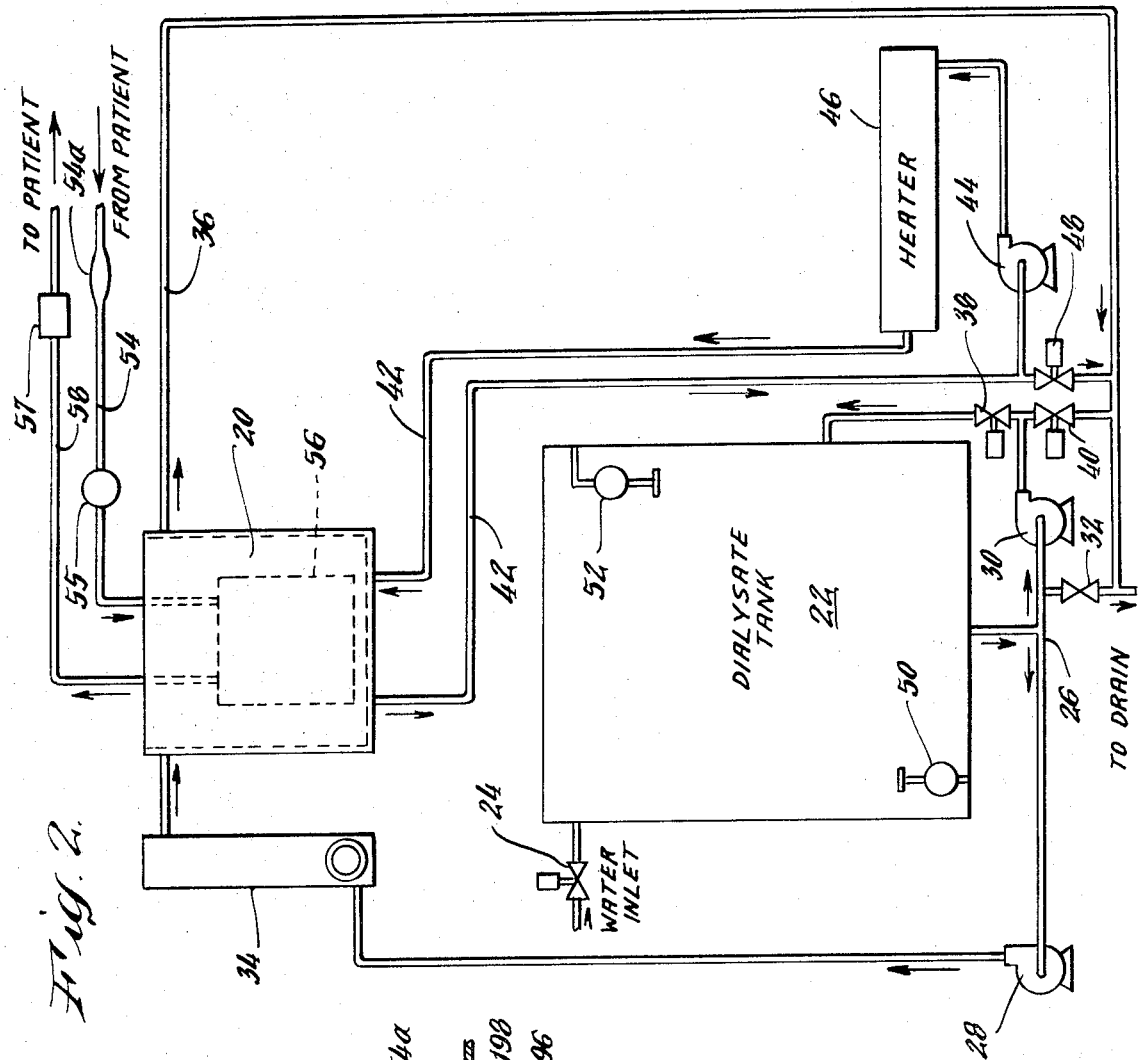
FIG. 2 is a schematic piping diagram of the machine of FIG. 1.

FIG. 2 is a piping diagram which illustrates the dialysate tank 22 supplied with water through a water inlet solenoid valve 24. The bottom of the tank is connected by a tee 26 to a supply pump 28, a drain pump 30, and a manual drain valve 32. The outlet from supply pump 28 is connected through a flowmeter 34 to the coil container 20. Used dialysate passes from the coil container to the drain via outlet line 36.

The outlet from the drain pump 30 may be connected to the dialysate tank through solenoid valve 38 or to drain through solenoid valve 40. A recirculating line 42 is connected from the bottom of the coil container 20 through recirculating pump 44 and heater 46. This recirculating line may also be connected to the drain through a solenoid valve 48. The dialysate tank is also provided with a low level float switch 50 and a high level float switch 52.

Blood from the patient passes to the machine through a plastic arterial line 54, which includes a conventional "pillow" enlargement 54a for arterial pressure monitoring, and a blood pump 55. The blood circulates through the dialysis coil 56, and returns to the patient through plastic venous line 58 and bubble trap 59. The venous line also passes through a tubing clamp 57.

Figure 5B:
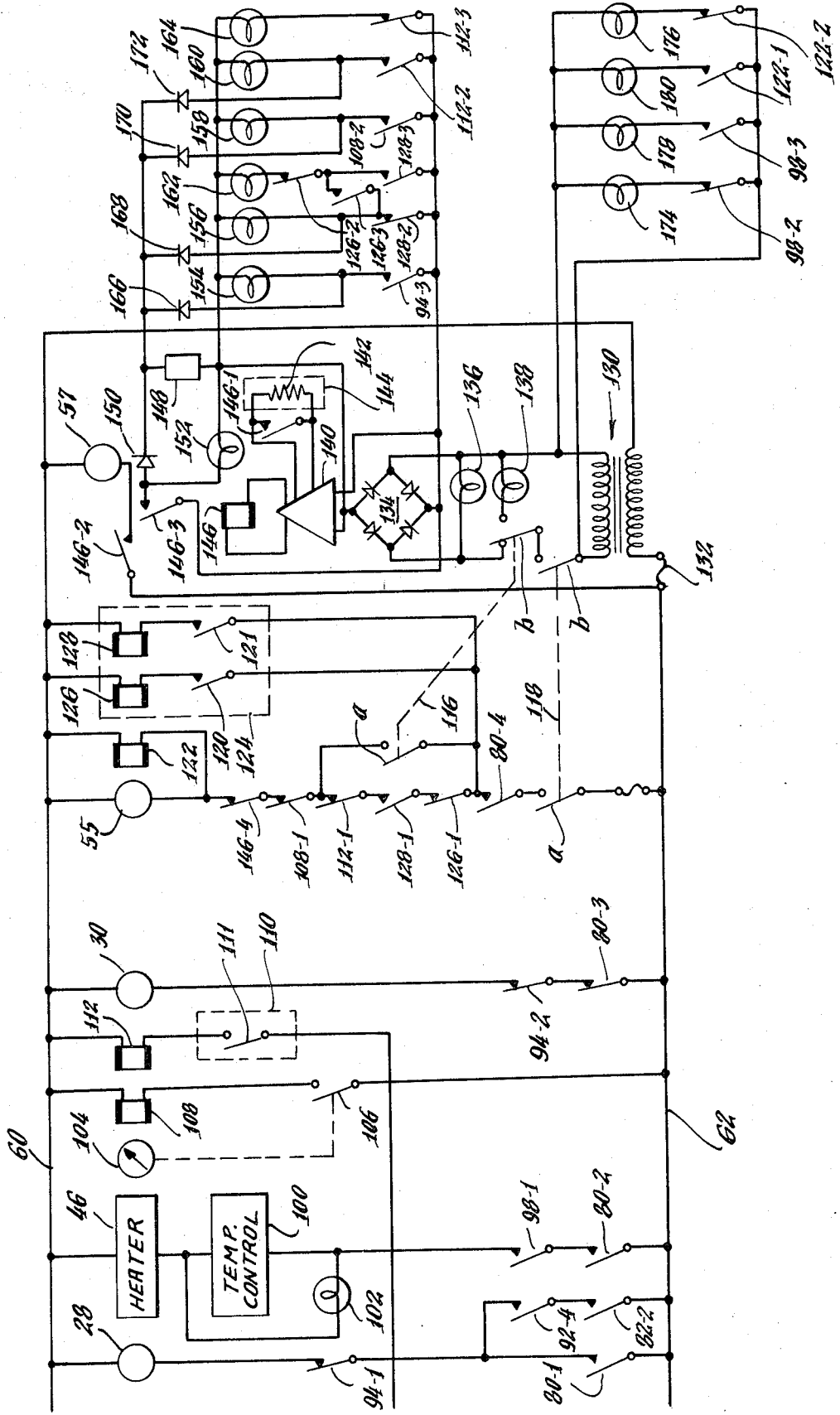

The schematic wiring diagram of the artificial kidney machine of this invention is illustrated in FIGS. 5A, 5B. Power is supplied to busses 60, 62 from a 120 volt a.c. source, through a ground fault current interrupter 64, such as Harvey Hubbell Model GEA-100, a double pole single throw power switch 66 and fuses 68. A convenience outlet 70 is provided for the use of the patient and may be used, for example, for plugging in a radio or television set. A light 72 across the main busses indicates when they are energized.

The heart of the control circuitry of the machine is a two-pole, four position switch 74. The poles *a, b* are each connected to bus 62 and are ganged together and operable through four positions from a single knob 76.

The described circuit includes a number of control relays, each comprising an operating coil and one or more operated contacts. To simplify the diagram, the contacts are illustrated as switches connected in proximity to the circuits which they control. Each such contact is given the number of its corresponding relay coil followed by a numeral "1", "2", "3", etc. Normally open contacts are shown as open switches, normally closed contacts are shown as closed switches. As an example, "start" relay coil 78 is shown connected between bus 60 and contact 5 of switch 74. Its contacts include normally open contacts 78-1 connected between solenoid valve 38 and bus 62 and normally closed contact 78-2 connected in series with recirculating pump 44.

In addition to the start relay 78, there is provided a "run" relay 80 connected between bus 60 and contact 6 of the four position switch and a "rinse" relay 82 connected between bus 60 and contact 8 of four position switch 74. Across each of these relay coils is an indicator light 84, 86, 88. Another light 90 is connected between bus 60 and contact 7 of switch 74 to indicate the "drain" condition.

A high water level relay coil 92 is connected in series with the parallel combination of contact 92-1 and high level float switch 52 between the bus 60 and contact 4 of the four position switch 74. The water inlet solenoid valve 24 is also connected in series with the contact 4 through relay contact 92-2. Low water level relay coil 94 is connected across the busses in series with low level float switch 50. Recirculating pump 44 is connected in series with a single pole, single throw switch 96 and with relay contacts 78-2, 92-3. A relay coil 98 is connected across this pump. The heater 46 is connected in series with a temperature controller 100 and contacts 98-1, 80-2 between busses 60, 62. An indicating lamp 102 is connected across the controller.

The temperature of the dialysate solution in the coil container 20 is monitored by a meter 104 which controls a high temperature switch 106 in series with a high temperature relay coil 108. An external arterial pressure monitor 110 is included and includes a switch 111 connected in series with a relay coil 112 between bus 60 and contact 2 of the four position switch 74. The conventional peristaltic blood pump 55 is connected between the busses 60, 62 in series with a number of relay contacts and one pole *a* of a double pole, double throw switch 116 which is connected in parallel with the series connected relay contacts 112-1, 128-1, 126-1. Also in series with the blood pump is pole *a* of double pole, single throw switch 118. The operating condition of the blood pump is monitored by a relay coil 122.

The venous pressure is monitored by a commercially available instrument, such as the "PHOTOHELIC" pressure switch/gauge produced by F. W. Dwyer Manufacturing Company, Inc. of Michigan City, Indiana. This instrument is indicated by the reference numeral 124 and includes a high pressure contact 120 operating relay coil 126 and a low pressure contact 121 operating relay coil 128.

The disclosed apparatus includes a blood level monitor circuit which is energized from the transformer 130 which has its primary winding connected between busses 60, 62 through fuse 132. The secondary energizes a fullwave rectifier 134 through pole *b* of switch 118 and pole *b* of switch 116. Energization of the rectifier is indicated by a green light 136. A yellow light 138 is connectable across the transformer by actuation of pole *b* of switch 116 and indicates that the blood level monitor is inactivated. The output of rectifier 134 is connected to a d.c. amplifier 140.

The amplifier 140 is normally off but may be switched on by the lowered resistance of a photosensitive resistor 142. This resistor is mounted in a blood level detector head 144. As shown in FIG. 1, this detector head is positioned on bubble trap 59 and includes, in addition to the resistor 142, a light source (not shown). The output of amplifier 140 operates a relay coil 146. Contact 146-1 of relay coil 146 is connected across the photosensitive resistor 142 as a latching contact. Contact 146-2 is connected in series with tubing clamp 57 across the busses 60, 62. A signalling circuit comprises a buzzer 148 in series with a diode 150 connected across a red light 152. The signalling circuit is connected in series across the rectifier output with contact 146-3. Red signal lights 154, 156, 158, and 160 and green signal lights 162, 164 are connected across the rectifier output in series with the illustrated contacts. In addition, diodes 166, 168, 170, 172 are connected to provide a path through buzzer 148 across each of the lights. Completing the circuit is a parallel combination of yellow lights 174, 176 and green lights 178, 180, each connected in series with an appropriate contact. The parallel combination is connected across the secondary of transformer 130.

Figure 3:
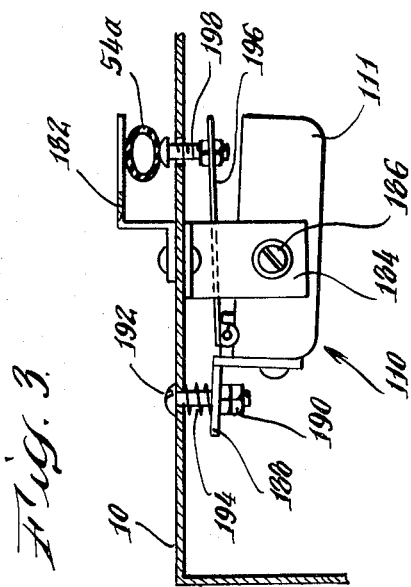
FIG. 3 is an enlarged illustration of the arterial pressure switch portion of the machine.

Returning now to FIG. 3, the construction of the arterial pressure monitor will be explained. This comprises a substantially Z-shaped bracket 182 mounted on cabinet 10 under which the pillow 54a of the arterial line is positioned. A second bracket 184 extends downwardly into the cabinet and supports the microswitch 111 on a pivot 186. An L-shaped angle member 188 is secured to the switch 111 and has a portion which extends substantially parallel to the top of cabinet 10. Secured to this horizontal portion are threaded nuts 190. An adjusting screw 192 extends downwardly from the top of the cabinet into engagement with the nuts 190 and downward resilient force is applied to the angle member 188 by means of a spring 194. The switch arm 196 carries a stub 198 which extends upwardly through an opening in the cabinet 10 into engagement with the lower surface of pillow 54a.

OPERATION

The operation of this apparatus will now be explained with particular reference to the diagrams of FIGS. 2 and 5. In order to understand the operation of the circuit in each of the four positions of switch 74, there is set forth below a table to indicate the closed or open position of each contact. An X indicates that the contact is closed, and a O indicates that it is open. Where two conditions are shown, such as O-X for contact 92-1, it indicates that a change occurs during the cycle. For example, relay coil 92 is in series with the high level float switch 52. During the "start" cycle, the high level float switch is open while the tank 22 is filling. But when the solution reaches its upper level, the switch 52 closes, energizing relay 92 and activating its contacts.

|       |       | Start | Run | Drain | Rinse |
|-------|-------|-------|-----|-------|-------|
|       | 78-1  | X     | O   | O     | O     |
| 2     |       | O     | X   | X     | X     |
|       | 80-1  | O     | X   | O     | O     |
|       | 2     | O     | X   | O     | O     |
| 3     |       | X     | O   | X     | X     |
|       | 4     | O     | X   | O     | X     |
|       | 82-1  | O     | O   | O     | O     |
|       | 2     | O     | O   | O     | X     |
|       | 92-1  | O-X   | O   | O     | X     |
|       | 2     | X-O   | X   | X     | X     |
|       | 92-3  | O-X   | O   | O     | X     |
|       | 4     | O-X   | O   | O     | X     |
|       | 94-1  | O-X   | X   | X-O   | X     |
|       | 2     | O-X   | X   | X-O   | X     |
|       | 3     | X-O   | O   | O-X   | O     |
|       | 96    | X     | X   | O     | X     |
|       | 98-1  | O     | X   | O     | X     |
|       | 2     | X     | O   | X     | O     |
|       | 3     | O     | X   | O     | X     |
|       | 108-1 | X     | X   | X     | X     |
|       | 2     | O     | O   | O     | O     |
|       | 112-1 | X     | X   | X     | X     |

|       |   |   |   |   |
|-------|---|---|---|---|
| 2     | O | O | O | O |
| 3     | X | X | X | X |
| 120   | O | O | O | O |
| 121   | O | X | O | O |
| 122-1 | O | X | O | O |
| 2     | X | O | X | X |
| 126-1 | X | X | X | X |
| 2     | X | X | X | X |
| 3     | O | O | O | O |
| 128-1 | O | X | O | O |
| 2     | X | O | X | X |
| 3     | O | X | O | O |
| 146-1 | O | O | O | O |
| 2     | O | O | O | O |
| 3     | O | O | O | O |
| 4     | X | X | X | X |

START CYCLE

In the start cycle, the switch 74 is turned to the position illustrated in FIG. 5. At the beginning of this cycle, solenoid valve 24 is energized and therefore open, permitting water to enter the tank 22. Low level switch 50 is also open but closes shortly after water begins to enter the tank. During this period while water is entering the tank and after the low level switch is closed, it will be noted that the solenoid valve 38 is open and that pump 30 is operating to recirculate the solution. It is recommended that during this filling period, the dialysate concentrate be added to the tank 22. Solenoid valves 40 and 48 are in their normally closed positions and blood pump 55 is inoperative as contact 80-4 is open.

When tank 22 has filled to its upper limit, high level float switch 52 closes, thus energizing relay coil 92. This in turn closes contact 92-1 which acts as a latching contact and opens contact 92-2 de-energizing the solenoid valve 24 and shutting off the water supply. At the same time, the contact 92-3 closes.

NORMAL RUN POSITION

Before dialysis can be started, the coil container 20 must be filled with dialysate. This is accomplished by advancing switch 74 to its second position with pole *a* on contact 2 and pole *b* on contact 6. In this position all solenoid valves are closed and pump 30 does not run due to the fact that contact 80-3 is open. Pump 28 is energized and pumps dialysate from tank 22 through flow meter 34 and coil container 20, finally passing to drain through line 36. Recirculating pump 44 is started by closing switch 96. Heater 46 is on, allowing dialysate to be heated and recirculated through the coil container 20.

It will be noted from the foregoing table that all the contacts in series with the blood pump 55 are closed and therefore the blood pump is running, the patient normally being connected to the machine in this configuration. All monitors are also connected. The arterial pressure monitor 110 is connected through pole *a* of switch 74. The venous pressure monitor 124 is activated through contact 80-4. The blood level monitor is connected through pole *b* of switch 116. Green light 178 indicates that the recirculating pump 44 is running and the green light 180 indicates that the blood pump 55 is running. Green light 162 indicates normal venous pressure, the low pressure contact 121 being closed and the high pressure contact 120 being open. Green light 164 indicates normal arterial pressure.

The operation of the monitors may be further explained at this point. The arterial pressure monitor has been illustrated in FIG. 3. The pressure which is exerted by the switch arm 196 upon the pillow 54*a* is readily adjustable by screw driver adjustment of screw 192. This is in marked contrast to many prior art devices wherein the switch is fixed and the pressure range is adjustable only by bending bracket 182. If the arterial pressure should increase sufficiently, it will close switch 111, thereby energizing relay coil 112. This will open contact 112-1 stopping blood pump 55. Contact 112-3 will open, causing the green light to go out, and contact 112-2 will close causing the red light 160 to go on. Contact 112-2 will also energizer buzzer 148 through diode 172, thus alerting the operator to an unnatural situation.

If venous pressure should get too high, switch 120 will close, energizing coil 126. This will open contact 126-1 shutting off blood pump 55. Contact 126-2 will open shutting off the green lamp 162. Contact 126-3 will close energizing red lamp 156 and will sound the buzzer as previously explained. A similar reaction will occur if the venous pressure becomes too low and switch 121 opens. Once again the blood pump will stop and red light 156 will be energized. It will be noted that the same light 156 serves as an alarm for either high or low venous pressure.

The detector head 144 of the blood level monitor has been previously set to a desired level on bubble chamber 59. As previously explained, the detector head includes a light source and a photosensitive resistor 142. The presence of blood would normally block light to the resistor. However, if the blood level should drop, the resistance of the resistor 142 will drop, turning on amplifier 140 which, in turn, energizes relay coil 146. Contact 146-1 closes to latch the amplifier into its on condition. Contact 146-2 will close and actuate the blood clamp 57 to thereby shut off the flow of blood. Contact 146-3 will close thereby actuating the warning lamp 152 and buzzer 148. Contact 146-4 opens to stop the blood pump 55.

DRAIN CYCLE

After dialysis has been completed, all solution is drained from the coil container and dialysate tank. This is accomplished by manually opening drain valve 32 and turning the four position switch 74 to its third position. Pole *b* of the four position switch illuminates lamp 90 and pole *a* opens solenoid valves 40, 48. The recirculating switch 96 is also opened. Pump 30 is in its running condition to assist drainage and it continues to run until the low level float switch 50 closes, thus energizing relay coil 94 and opening contact 94-2. In this cycle, all monitors are electrically disconnected.

RINSE, STERILIZE

This cycle recirculates either rinse water or a sterilizing formaldehyde or chlorine solution through the entire system. It operates in a fashion similar to that of the run cycle except that all monitors are disconnected. The storage tank 22 will fill automatically as in the start cycle. It is believed that this cycle will be obvious from the foregoing description of the start and run cycles and the above table.

It is believed that the many advantages of this invention will now be apparent to those skilled in the art. It will also be apparent that a number of variations and modifications may be made in this invention without departing from its spirit and scope. Accordingly, the foregoing description is to be construed as illustrative

We claim:

1. An artificial kidney apparatus comprising: a dialyzer unit including means for passing a patient's blood therethrough; a dialysis fluid tank; water inlet means connected to said dialysis fluid tank; means for passing dialysis fluid from said tank, through said dialyzer unit, to waste; a heater; means for recirculating a portion of the dialysis fluid in said dialyzer unit through said heater; a bracket for retaining the pressure pillow portion of the patient's arterial line; a pivotally mounted switch having its switch arm in contact with said pressure pillow; screw means for adjustably positioning said switch about its pivot to vary the force between said pillow and switch arm; means for controlling each of said blood passing means, water inlet means, dialysis fluid passing means, and recirculating means in accordance with one of a plurality of preselected program cycles; single multi-position switch means for selecting and implementing any one of said cycles; means responsive to said pivotally mounted switch for stopping the patient's blood flow in response to a preselected physical condition; and means for indicating the existence of such preselected physical condition.

2. An artificial kidney apparatus comprising: a dialyzer unit including means for passing a patient's blood therethrough; a bubble chamber in said blood passing means; a dialysis fluid tank; water inlet means connected to said dialysis fluid tank; means for passing dialysis fluid from said tank, through said dialyzer unit, to waste; a heater; means for recirculating a portion of the dialysis fluid in said dialyzer unit through said heater; means for controlling each of said blood passing means, water inlet means, dialysis fluid passing means, and recirculating means in accordance with one of a plurality of preselected program cycles; single multi-position switch means for selecting and implementing any one of said cycles; a detector head associated with said bubble chamber and responsive to blood level therein; an amplifier controlled by said detector head to produce an output signal upon variation in said blood level; relay means actuatable by said output signal; blood line clamping means operated by actuation of said relay means; and means for indicating the existence of such blood level variation.

3. An artificial kidney apparatus comprising: a dialyzer unit including means for passing a patient's blood therethrough; a dialysis fluid tank; water inlet means connected to said dialysis fluid tank; means for passing dialysis fluid from said tank, through said dialyzer unit, to waste; a heater; means for recirculating a portion of the dialysis fluid in said dialyzer unit through said heater; means for monitoring a patient's condition throughout dialysis; means for controlling each of said blood passing means, water inlet means, dialysis fluid passing means, and recirculating means in accordance with one of a plurality of preselected program cycles; a two pole switch having at least four cycle selection positions for selecting and implementing any one of said cycles; means responsive to said monitoring means for stopping the patient's blood flow in response to a preselected physical condition; and means for indicating the existence of such preselected physical condition.

4. An artificial kidney apparatus comprising: a dialyzer unit including motor-powered blood pump means for passing a patient's blood therethrough; a dialysis fluid tank; water inlet means connected to said dialysis fluid tank; means for passing dialysis fluid from said tank, through said dialyzer unit, to waste; a heater; means for recirculating a portion of the dialysis fluid in said dialyzer unit through said heater; means for monitoring a patient's condition throughout dialysis; means for controlling each of said blood passing means, water inlet means, dialysis fluid passing means, and recirculating means in accordance with one of a plurality of preselected program cycles; single multiposition switch means for selecting and implementing any one of said cycles; a plurality of electrical contacts in series with the blood pump motor across a power supply, each of said contacts being operable from different monitoring means for stopping the patient's blood flow in response to a preselected physical condition; and means for indicating the existence of such preselected physical condition.

5. The apparatus of claim 4 wherein said monitoring means comprises: venous pressure measuring means for actuating a first of said electrical contacts upon an increase in venous pressure above a preselected limit and for actuating a second of said electrical contacts upon a decrease in venous pressure below a preselected limit.

6. The apparatus of claim 5 wherein said blood passing means includes a bubble chamber and wherein said monitoring means comprises: a detector head associated with said bubble chamber and responsive to blood level therein; an amplifier controlled by said detector head to produce an output signal upon variation in said blood level; relay means actuatable by said output signal; and blood line clamping means operated by actuation of said relay means.

7. The apparatus of claim 6 wherein said monitoring means comprises: a bracket for retaining the pressure pillow portion of the patient's arterial line; a pivotally mounted switch having its switch arm in contact with said pressure pillow; and screw means for adjustably positioning said switch about its pivot to vary the force between said pillow and switch arm.

8. The apparatus of claim 7 wherein said multiposition switch means comprises a two pole switch having at least four cycle selection positions.

* * * * *